(12) United States Patent
Nagaraddi et al.

(10) Patent No.: US 12,493,504 B2
(45) Date of Patent: Dec. 9, 2025

(54) METHODS AND SYSTEMS FOR REAL-TIME RESOLUTION OF ERRORS THAT ARE DETECTED BY MULTIVARIATE MACHINE LEARNING MODELS BETWEEN USERS USING UNIVARIATE RESPONSES

(71) Applicant: Capital One Services, LLC, McLean, VA (US)

(72) Inventors: Vinuta Nagaraddi, McLean, VA (US); Shelly Bergman, McLean, VA (US); Abhishek Tewari, McLean, VA (US); Prableen Kaur, McLean, VA (US); Yasong Zhou, McLean, VA (US); Xiaolong Bao, McLean, VA (US); Andrew Cozzolino, McLean, VA (US); Soma Sekhar Tankala, McLean, VA (US); Junli Yuan, McLean, VA (US); Gowtham Guduru, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1151 days.

(21) Appl. No.: 17/204,541

(22) Filed: Mar. 17, 2021

(65) Prior Publication Data

US 2022/0300364 A1    Sep. 22, 2022

(51) Int. Cl.
*G06F 11/07* (2006.01)
*G06N 3/08* (2023.01)
*G06N 7/01* (2023.01)
*G06N 20/00* (2019.01)

(52) U.S. Cl.
CPC .......... *G06F 11/0745* (2013.01); *G06N 3/08* (2013.01); *G06N 7/01* (2023.01); *G06N 20/00* (2019.01)

(58) Field of Classification Search
None
See application file for complete search history.

(56) References Cited

U.S. PATENT DOCUMENTS

| 2013/0332602 A1* | 12/2013 | Nakil | H04L 43/04 709/224 |
| 2014/0310162 A1* | 10/2014 | Collins | G06F 3/04842 707/769 |
| 2019/0340658 A1* | 11/2019 | Udupa | G06Q 30/0239 |
| 2022/0269517 A1* | 8/2022 | Matula | G06F 40/174 |

OTHER PUBLICATIONS

Brabrand, Claus, Anders Møller, Mikkel Ricky, and Michael I. Schwartzbach. "Powerforms: Declarative client-side form field validation." World Wide Web 3 (2000): 205-214. (Year: 2000).*

(Continued)

*Primary Examiner* — Vincent Gonzales
(74) *Attorney, Agent, or Firm* — Foley & Lardner LLP (57) ABSTRACT

Methods and systems are for generating real-time resolutions of errors arising from user submissions, computer processing tasks, etc. For example, the methods and systems described herein recite improvements for detecting errors in one or more user submissions and providing resolutions in real-time. To provide these improvements, the methods and systems use a machine learning model that is trained to return probability error scores based on a plurality of variables. By using the multivariate approach, the methods and systems may produce a highly accurate detection.

20 Claims, 6 Drawing Sheets

(56) References Cited

OTHER PUBLICATIONS

Chandola, Varun, Arindam Banerjee, and Vipin Kumar. "Anomaly detection: A survey." ACM computing surveys (CSUR) 41, No. 3 (2009): 1-58. (Year: 2009).*

Taware, Shwetkranti N., and Vaishali Kolhe. "A System to Improve Data Quality in healthcare using Naïve Bayes Classifier." International Journal of Computer Science and Information Technologies 5, No. 4 (2014): 5206-5209. (Year: 2014).*

\* cited by examiner

Model Parameters Categories
300

| Credit Bureau | Geography | Fraud Indicators | Derived Values | Credit Decision Engine |
|---|---|---|---|---|
| • SSN Reported Freq for Another*<br>• SSN Not Issued Prior to 2011*<br>• SSN Reported by Single Bureau*<br>• SSN Variation: Application vs CBR*<br>• High Probability SSN belongs to Another*<br>• SSN Issued Prior to DOB*<br>• Inquiry age younger than SSN Issue Date*<br>• Address Discrepancy: Application vs CBR*<br>• Address Mismatch: | • Dealer address<br>• Dealer State<br>• Applicant(s) address<br>• Applicant state | • Prior Declines for SSN<br>• Prior Fraud<br>• Fraud Report | • Applicant Number<br>• Request Number<br>• Social Security # | • Credit Report A<br>• Credit Report B<br>• Credit Report C |

METHODS AND SYSTEMS FOR REAL-TIME RESOLUTION OF ERRORS THAT ARE DETECTED BY MULTIVARIATE MACHINE LEARNING MODELS BETWEEN USERS USING UNIVARIATE RESPONSES

FIELD OF THE INVENTION

The invention relates to real-time resolution of errors detected by multivariate machine learning models using univariate responses.

BACKGROUND

In recent years, the use of artificial intelligence and machine learning applications has increased. The applications are routinely tasked with performing ever more complex tasks and doing so in shorter amounts of time. This balance of complexity of tasks and decreasing amount of processing time is particularly delicate in applications featuring interactions with human users in situational context. For example, in order to properly aid human users (e.g., by supplementing an ongoing conversation or interaction), the machine learning applications must perform complex computational tasks, must produce accurate results, and must do so in real-time (e.g., prior to the end of the conversation or interaction). Juggling these various technical problems is an ongoing challenge.

SUMMARY

Accordingly, methods and systems are described herein for generating real-time resolutions of errors arising from user submissions, computer processing tasks, etc. For example, the methods and systems described herein recite improvements for detecting errors in one or more user submissions and providing resolutions in real-time. To provide these improvements, the methods and systems use a machine learning model that is trained to return probability error scores based on a plurality of variables. By using the multivariate approach, the methods and systems may produce a highly accurate detection.

However, a multivariate approach has several downsides. First, a multivariate approach may require additional processing time to generate a recommendation. This is particularly problematic for situational uses that may require real-time results (e.g., prior to the end of the conversation or interaction between two users). Second, the multivariate approach may produce a result that requires additional analysis to understand. This once again creates a problem for situational uses during a conversation or interaction between two users, as one user may need to pause the conversation to interpret the results. Third, the multivariate approach requires the collection of numerous variables. This yet again poses a problem for situational uses during a conversation or interaction between two users, as one user may need to pause the conversation to input the numerous variables.

In light of these technical challenges, the methods and systems provide at least three technical features that ensure the use of a multivariate machine learning model during conversational interactions between users. First, the methods and systems include generating an error likelihood recommendation as opposed to definitively identifying whether or not an error has occurred. By doing so, the system reduces processing time required for the recommendation. Second, the methods and systems include generating a univariate response. By limiting the number of variables upon which the response is generated, the methods and systems both further reduce processing time, but also reduce difficulties in interpreting results (e.g., by a user during the ongoing conversation or interaction). Finally, the methods and systems use a microservice to collect the plurality of variables for the multivariate machine learning model, thus limiting the amount of information required to be submitted by a user.

Moreover, even after the univariate response has been determined, the method and systems recite additional location and retrieval steps such as determining a network location of the univariate response, generating a network pathway to the univariate response, retrieving the univariate response from a network location, and generating for display, on a user interface, the univariate response. These additional processing steps further reduce any disruption to a conversation or interaction between two users thus ensuring the multivariate machine learning models, despite its technical limitations, may be applied to real-time resolutions, and in particular situational uses during a conversation or interaction between two users.

In some aspects, a system and method is implemented for real-time resolution of errors detected by multivariate machine learning models using univariate responses. For example, the system may generate, at a first user interface corresponding to a first user, an error likelihood recommendation based on processing a multivariate submission of a second user that is received using a second user interface using the machine learning model, and wherein the machine learning model is trained to return probability error scores based on a plurality of variables collected by a microservice. The system may determine a univariate response corresponding to the recommendation. The system may determine a network location of the response. The system may generate a network pathway to the response. The system may retrieve the response from a network location. The system may generate for display, on the user interface, the response on the first user interface.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
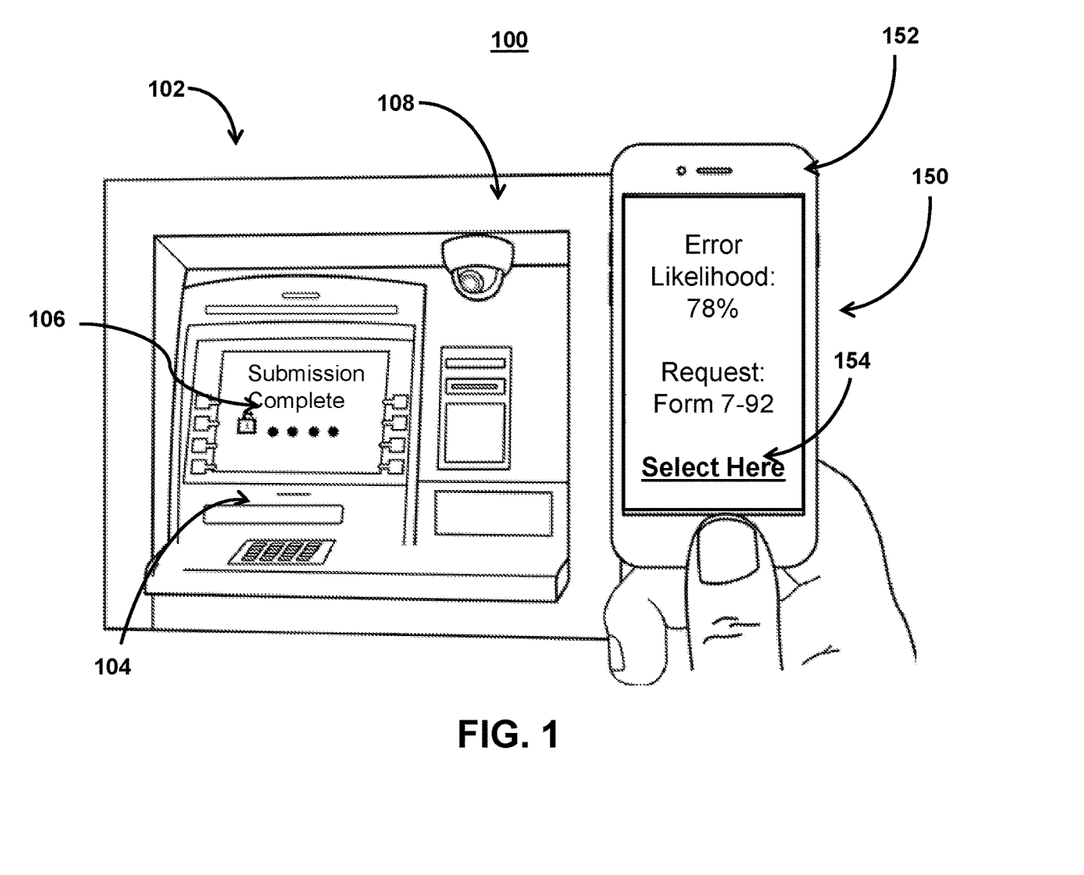
FIG. 1 shows an illustrative system for real-time resolution of errors detected by multivariate machine learning models using univariate responses featuring a kiosk and mobile device, in accordance with one or more embodiments.

FIG. 1 shows an illustrative system for real-time resolution of errors detected by multivariate machine learning models using univariate responses featuring a kiosk and mobile device, in accordance with one or more embodiments. For example, FIG. 1 shows system 100. System 100 includes kiosk 102 and secondary device 150. Kiosk 102 may include display 106 whereas secondary device 150 may include display 152. Information used to conduct operations using system 100 may appear on display 106 and display 152. System 100 may include camera 108, which may be positioned to capture images of a user at the kiosk (e.g., a user using keypad 104).

For example, kiosk 102 may be an automatic teller machine or other device at an electronic banking outlet that allows a user to complete basic operations without the aid of a branch representative or teller. Additionally or alternatively, kiosk 102 may represent a kiosk (or computer monitor) at a location (e.g., a car dealership) at which a user is requesting a car loan. Kiosk 102 may provide real-time results for the auto financing applications and/or questions. For example, kiosk 102 may provide real-time results for detecting the likelihood of errors (e.g., fraud, typos, missing information, etc.) in a credit application. By performing these operations in real-time, the system may allow for corrective actions (e.g., the filing of appropriate follow-up documents, answering of questions, corrections to an application) while the user is at the location.

For example, in a non-limiting embodiment, the system may be used to score all incoming auto-application approvals at the underwriting stage. For example, a first user may enter information into a kiosk or other device. The information may then be processed by the system (e.g., the multivariate machine learning model). Higher scores produced by the system (e.g., the multivariate machine learning model) may correspond to higher error (e.g., fraud) risk of the application. For example, scores above a predetermined threshold may be flagged for manual review by a second user. The second user may use standard policy and procedures to pass/fail the manual review based on the suspected error. In such an embodiment, a microservice used to collect information about the first user and a machine learning model that is trained to detect errors (e.g., fraud) in the application may be used. For example, in the underwriting phase of the auto loan application process, the microservice may gather one or more (e.g., ten, twenty, thirty, forty, or fifty) input parameters from multiple components that fall into various categories (e.g., bureau triggers, existing fraud indicators, credit, and geography). The system may trigger a machine learning model to generate an error likelihood and save the error likelihood score in a local database to be retrieved at a later time. The score may be used in the underwriting phase to determine if additional documentation or actions are needed to complete the underwriting process. If additional documentation or actions are needed to complete the underwriting process, the system may determine what documentation or actions are needed, locate the documentation or materials to complete the actions, and generate a network pathway to the documentation or materials, and provide the documentation or materials to a second user. For example, the documentation and/or actions may be inputs/requirements that are triggered by a particular score (e.g., a high score) on a test (e.g., a fraud detection test). The system may provide this approval and/or any required documentation or materials in real-time while the first user waits.

It should be noted that as described herein a first user and/or a second user may have varying roles and/or responsibilities. For example, in some embodiments, actions performed by a first user (or actions performed by the system in response to the first user), may instead be performed by a second user. Similarly, in some embodiments, the actions (or actions performed by the system in response to the first user and second user), may be performed by a single user.

To provide both speed an accuracy, the system may use a machine learning model that uses an XGBoost (Gradient Boosting based) algorithm that makes use of primarily user information that includes bureau triggers, existing fraud indicators, credit and geography. This may include fifty variables collected by a microservice. These variables are used as its inputs and returns a probability error score for every application. Higher scores correspond to higher fraud risk. The system may use an XGBoost-based model because XGBoost may capture complex, non-linear relationships between variables, as compared to logistic regression, while giving a rank-ordering of applications by risk. Accordingly, the XGBoost algorithm, as opposed to other algorithms such as a logistic regression, may provide a likelihood of error, which may then be used for a manual review. The machine learning model may be trained using historic confirmed error data.

In some embodiments, kiosk 102 and secondary device 150 may initiate a temporary device session in order to perform operations. For example, the temporary device session may be initiated and maintained through the exchange of QR code and/or other image-based and/or electrically communicated codes.

In some embodiments, the system may also capture biometric data, and/or camera 108 may be configured to account for a user's head movement and/or the position of a user's head while using kiosk 102. In some embodiments, in order to account for a user's head position, camera 108 may include two or more cameras. For example, two cameras may be arranged to form a stereo vision system for obtaining a 3D position of the user's eye or eyes. Furthermore, multiple cameras may allow kiosk 102 control circuitry to compensate for head movement when determining the user's gaze point. The two or more cameras may be part of a single unit or may be separate units. In other embodiments, each user device (e.g., user device 222 (FIG. 2)) and camera 108 may include an optical sensor, and kiosk 102 control circuitry receives image data from the optical sensor of the user device and the optical sensor of camera 108. In some embodiments, the system may receive biometric data (e.g., a fingerprint, signature verification, etc.) from another device.

The system may, in response to user data entered at kiosk 102 (or secondary device 150), retrieve a verification form based on an error recommendation likelihood. For example, the system may retrieve a particular verification form that corresponds to a type, amount, and/or other characteristic of the error (e.g., a value that causes error). Each verification may display particular information and/or information of a particular type. Alternatively or additionally, each verification may provide a given function (e.g., curing a particular type of error). This function may be a locally performed function (e.g., a function performed on a local device) or this function may be a remotely-executed function. In some embodiments, a verification may represent a link to additional information and/or other features, which may be accessed and/or available locally or remotely. In some embodiments, the verification may be represented by textual and/or graphical information (e.g., an electrically consumable document).

The system may include a verification reference (e.g., metadata or other information that describes the verification required). For example, the verification reference may include information about the error purpose, functions, origin, system requirements (including required formats and/or capabilities), author, recommended use and/or user, related features (including features designated as complimentary, redundant, and/or incompatible). The verification reference may include a description that may be expressed in a human and/or computer readable language. The verification reference may also include a reference or pointer to user profile information that may be relevant to the selection and/or use of the verification. The system may retrieve this information and/or compare it to the description in order to select and/or use the verification. For example, the description may indicate that the verification uses a particular format and/or displays data in a particular language. The system may retrieve information from a user profile that indicates a device format associated with the user and/or a language setting associated with the user. The system may then determine whether or not the retrieved information corresponds to the description.

The system may access a user profile. The user profile may be stored locally on a user device and/or remote. The user profile may include information about a user and/or device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a verification towards a user and/or customize verifications for a user.

For example, as shown in FIG. 1, secondary device 150 may include first univariate response 154. First univariate response 154 may have been pre-fetched by the system prior to a user activating an application (e.g., a verification registry application) that generates the feature for display. The system may pre-fetch this information based on information in the user profile (e.g., a user preference or setting), a predetermined or standard verification selection (e.g., by the application), a previously selected verification (e.g., a verification that was present the last time the application was used), and/or a real-time determination of a verification registry. For example, the verification registry may continuously, and in real-time, update information about a user and/or verifications required. The system may continuously pre-fetch this information and/or may push this information to a local user device and/or edge server for immediate use if an application is activated. Accordingly, the system may minimize delays attributed to populating verification templates and/or providing verification and information for verifications.

For example, the system may select a verification based on user insights and the verifications (e.g., related metadata) may be streamed to the mobile application prior to the user accessing the mobile application (e.g., at least while the user is logged out) such that the verifications are presented in the user's landing page (or other mobile app templated page) when the user logs into or otherwise accesses the mobile application. In another example, network location of a verification may be removed or replaced with an alternative location based on the current availability status of the location (e.g., if a verification is currently down, then a similar verification is generated for display). In some embodiments, the verification and the alternative verification are streamed as an associated pair/set to the kiosk 102 and/or secondary device 150, and, if the location is detected to be down, the system may select the alternative verification in its place.

In FIG. 1, secondary device 150 may include a first link. For example, the link may include a hyperlink. For example, the link may include a link from a hypertext file or document to another location or file, typically activated by clicking on a highlighted word or image on the screen. The link may be an inline link that displays remote content without the need for embedding the content. For example, the inline link may display a modified version of accessible content (e.g., an image, a thumbnail, low resolution preview, cropped section, or magnified section of the accessible content). Alternatively the link may be an anchor link and/or fat link. In some embodiments, the first link may comprise a push notification.

Figure 2:
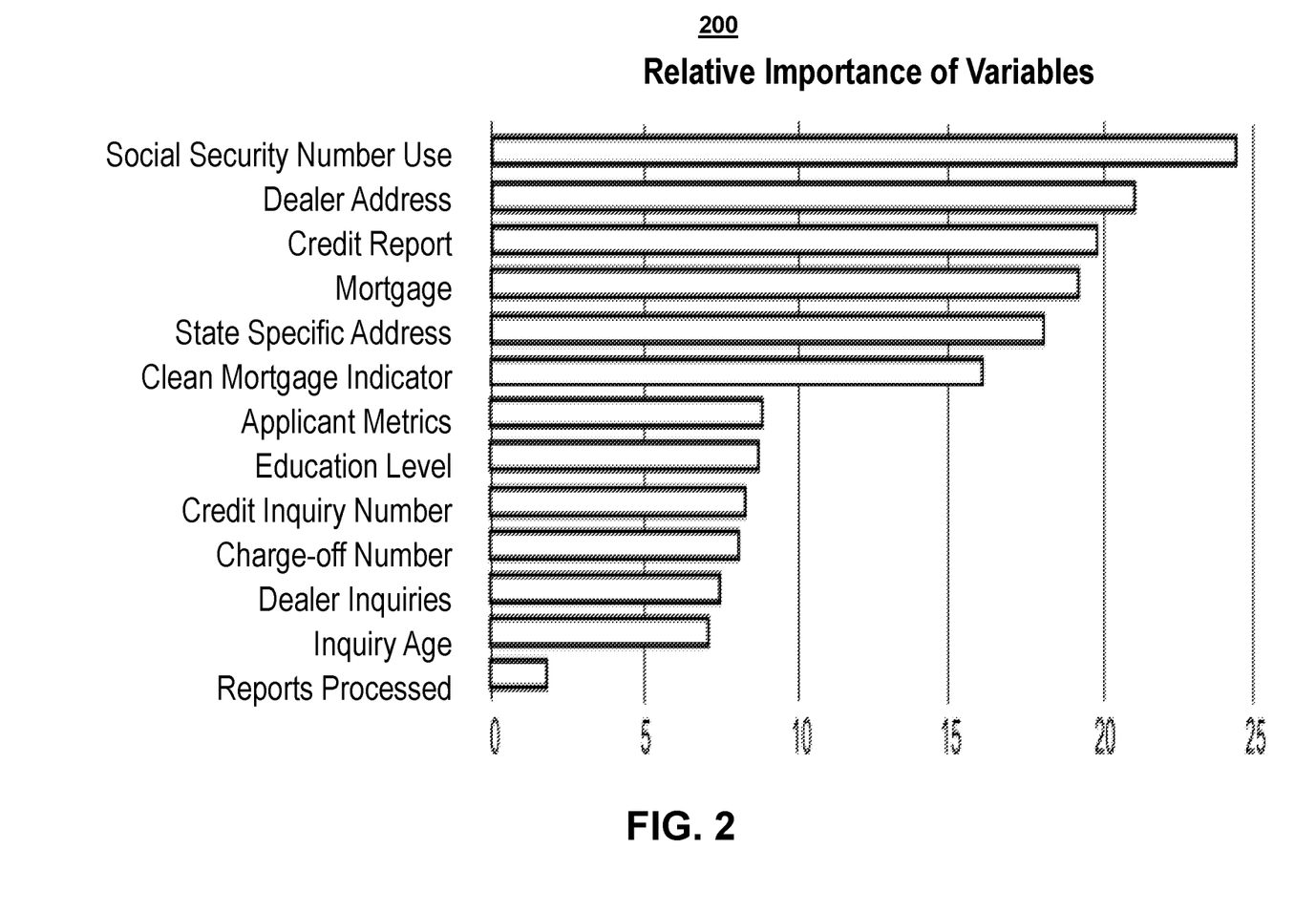
FIG. 2 shows an illustrative diagram of the importance of different variables to the real-time resolution of errors detected by multivariate machine learning models, in accordance with one or more embodiments.

FIG. 2 shows an illustrative diagram of the importance of different variables to the real-time resolution of errors detected by multivariate machine learning models, in accordance with one or more embodiments. For example, diagram 200 illustrates a plurality of variables that may be collected by the microservice and/or used by a machine learning model to determine an error likelihood recommendation comprising a probability error score for the second user generated by the machine learning model. For example, the system may determine statistical importance of the plurality of variables. The system may then determine a univariate response based on the variable with the highest importance and/or above a threshold importance.

For example, the system may receive one or more models and/or parameters that correspond to one or more categories. These categories may relate to information about credit statistics (e.g., statistics that related to the credit of a user), geography (e.g., the location of one or more users), known fraud indicators (e.g., known fraud indicators for one or more transactions), derived values (e.g., metrics about a given users), and/or third-party engines (e.g., information received from third-party sources). The system may weigh the value of these one or more variables (or categories) higher and/or lower than other variables (or categories). For example, as shown in FIG. 2, the system may weigh the importance of derived values (e.g., a social security number of a user) higher than that of a third-party engine report. For example, as shown in FIG. 2, variables such as the use of a social security number and a particular state (e.g., California and Illinois are higher than Utah). Similarly, the importance of variables such as the number of reports processed, while relative, is lower.

For example, the system may determine the variable importance using a Gini index. The Gini index may be calculated by subtracting the sum of the squared probabilities of each class from one. The Gini index favors larger partitions. For example, information gain multiplies the probability of the class times the log (base=2) of that class probability. Information gain favors smaller partitions with many distinct values.

Alternatively or additionally, the system may determine the variable importance using stepwise regression. For example, stepwise regression is a method of fitting regression models in which the choice of predictive variables is carried out by an automatic procedure. In each step, a variable is considered for addition to or subtraction from the set of explanatory variables based on some prespecified criterion. Alternatively or additionally, the system may determine the variable importance using chi-square tests. In a chi-squared test, a statistical hypothesis test is performed where the test statistic is chi-squared distributed under the null hypothesis. A chi-squared test is used to determine whether there is a statistically significant difference between the expected frequencies and the observed frequencies in one or more categories of a contingency table.

Figure 3:
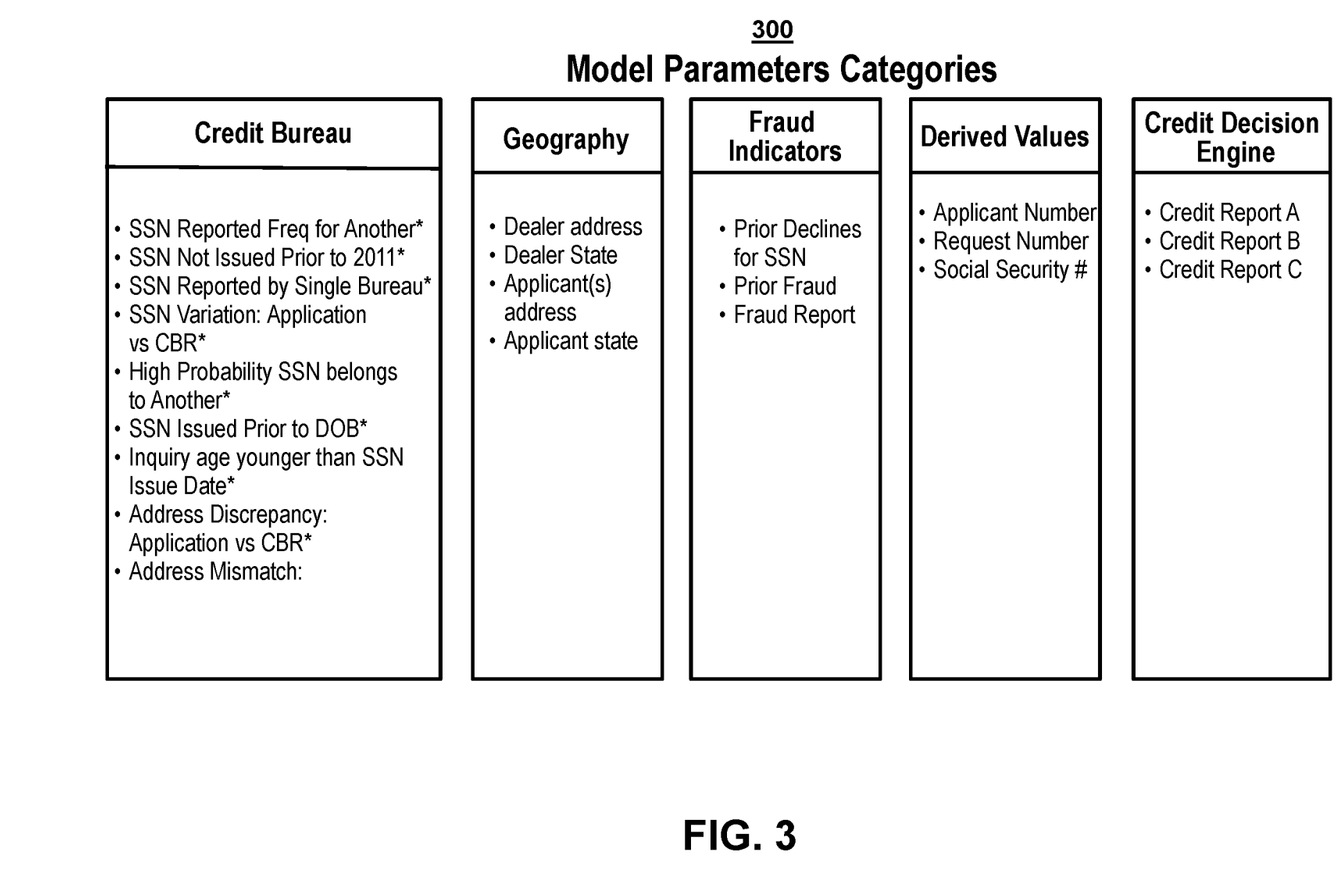
FIG. 3 shows an illustrative diagram of categorized variables used for the real-time resolution of errors detected by multivariate machine learning models, in accordance with one or more embodiments.

FIG. 3 shows an illustrative diagram of categorized variables used for the real-time resolution of errors detected by multivariate machine learning models, in accordance with one or more embodiments. For example, diagram 300 illustrates model parameter categories for the plurality of variables that may be collected by the microservice and/or used by a machine learning model to determine an importance of variables in different categories to determine an error likelihood recommendation comprises a probability error score for the second user generated by the machine learning model. For example, the system may determine statistical importance of the plurality of variables and determine a category of the variables with the highest importance and/or above a threshold importance. The system may then select a univariate response based on the determined category.

For example, the system may receive one or more models and/or parameters that correspond to one or more categories. These categories may relate to information about credit bureau statistics (e.g., statistics that related to the credit of a user), geography (e.g., the location of one or more users), known fraud indicators (e.g., known fraud indicators for one or more transactions), derived values (e.g., metrics about a given users), and/or third-party engines (e.g., information received from third-party sources). For example, credit bureau statistics may include credit reports, social security use, address mismatches. Geography may include a dealer address and/or a customer address. Fraud indicators may include prior credit checks and/or results thereof, prior fraud detections for the user, etc. Derived values may include applicant counts, number of total users, number of requests, etc. Credit decision engines may include credit decisions by third party reports.

Figure 4:
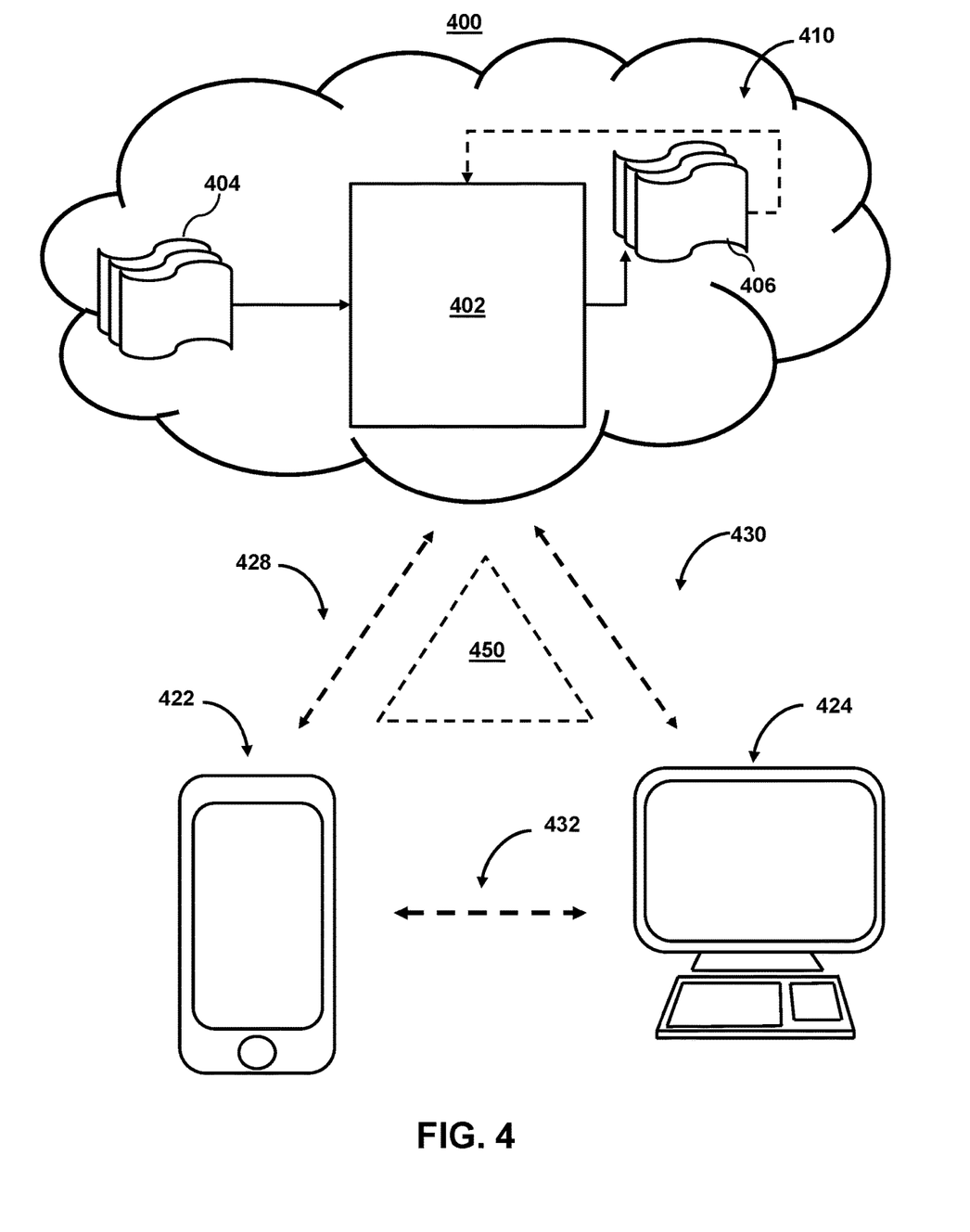
FIG. 4 shows an illustrative system for real-time resolution of errors detected by multivariate machine learning models using univariate responses, in accordance with one or more embodiments.

FIG. 4 shows an illustrative system for real-time resolution of errors detected by multivariate machine learning models using univariate responses, in accordance with one or more embodiments. FIG. 4 shows an illustrative system diagram for detecting, reporting, and/or responding fraudulent behavior, in accordance with one or more embodiments. For example, system 400 may represent the components used for detecting, reporting, and/or responding to fraudulent behavior, as shown in FIGS. 1-3. As shown in FIG. 4, system 400 may include mobile device 422 and user terminal 424 (which in some embodiments may correspond to kiosk 102 (FIG. 1) and secondary device 150 (FIG. 1)). While shown as a smartphone and personal computer, respectively, in FIG. 4, it should be noted that mobile device 422 and user terminal 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users may, for instance, utilize one or more devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of mobile device 422, those operations may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., as shown in FIG. 1).

Additionally, as mobile device 422 and user terminal 424 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database configured to store user data for a user. For example, the database may include user data that the system has collected about the user through prior interactions, both actively and passively. Alternatively, or additionally, the system may act as a clearing house for multiple sources of information about the user. This information may be compiled into a cross-platform profile. For example, one or more of cloud components 410 may include a microservice and/or components thereof. In some embodiments, the microservice may be a collection of applications that each collect one or more of the plurality of variables.

Cloud components 410 may include model 402, which may be a machine learning model. Model 402 may take inputs 404 and provide outputs 406. The inputs may include multiple datasets such as a training dataset and a test dataset. Each of the plurality of datasets (e.g., inputs 404) may include data subsets related to user data, original content, and/or alternative content. In some embodiments, outputs 406 may be fed back to model 402 as inputs to train model 402. For example, the system may receive a first labeled feature input, wherein the first labeled feature input is labeled with a known error (or error likelihood) for the first labeled feature input (e.g., based on a collection of variables). The system may then train the first machine learning model to classify the first labeled feature input with the known error (or error likelihood).

In another embodiment, model 402 may update its configurations (e.g., weights, biases, or other parameters) based on the assessment of its prediction (e.g., outputs 406) and reference feedback information (e.g., user indication of accuracy, reference labels, or other information). In another embodiment, where model 402 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs. During training, an output layer of model 402 may correspond to a classification of model 402, and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., an incident).

For example, in some embodiments, the system may train a machine learning model (e.g., an artificial neural network) to detect known error (or error likelihood) based on a collection of variables. For example, the system may receive user data (e.g., comprising the variables and categories of variables described in FIGS. 2-3). The system may then generate a series of feature inputs based on the training data. For example, the system may generate a first feature input based on training data comprising user data corresponding to a first known error (or error likelihood). The system may label the first feature input with the first known error (e.g., labeling the data as corresponding to a classification of a given error type or likelihood).

For example, in some embodiments, the system may train a machine learning model (e.g., an artificial neural network) to determine a univariate response corresponding to the recommendation (e.g., a given error or error likelihood). For example, the system may receive an error recommendation (e.g., comprising a given error type and/or error likelihood). The system may then generate a series of features inputs based on the error recommendation. For example, the system may generate a first feature input based on training data comprising error recommendation and the system may determine a response (e.g., particular documentation or actions) corresponding to responding to a first known error recommendation. The system may label the first feature input with the first known error recommendation (e.g., labeling the data as corresponding to a classification of a given error type or likelihood).

The system may then train a machine learning model to detect the first known incident based on the labeled first feature input. The system may also train a machine learning model (e.g., the same or different machine learning model) to detect the second known incident based on the labeled second feature input. For example, the training process may involve initializing some random values for each of the training matrices (e.g., of a machine learning model) and attempting to predict the output of the input feature using the initial random values. Initially, the error of the model will be large, but comparing the model's prediction with the correct output (e.g., the known classification), the model is able to adjust the weights and biases values until having the model provides the required predictions.

The system may receive user data via a microservice and/or other means. For example, the microservice may comprise a collection of applications that each collect one or more of a plurality of variables. For example, the system may extract user data from an API layer operating on a user device or at a service provider (e.g., via a cloud service accessed by a user). Additionally or alternatively, the system may receive user data files (e.g., as a download and/or streaming in real-time or near real-time).

System 400 also includes API layer 450. For example, in some embodiments, the system may be implemented as one or more APIs and/or an API layer. In some embodiments, API layer 450 may be implemented on user device 422 or user terminal 424. Alternatively or additionally, API layer 450 may reside on one or more of cloud components 410. API layer 450 (which may be A REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 450 may use various architectural arrangements. For example, system 400 may be partially based on API layer 450, such that there is strong adoption of SOAP and RESTful Web-services, using resources like Service Repository and Developer Portal but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside, in this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use developer portal. API layer 450 may use strong security constraints applying WAF and DDoS protection, and API layer 450 may use RESTful APIs as standard for external integration.

Figure 5:
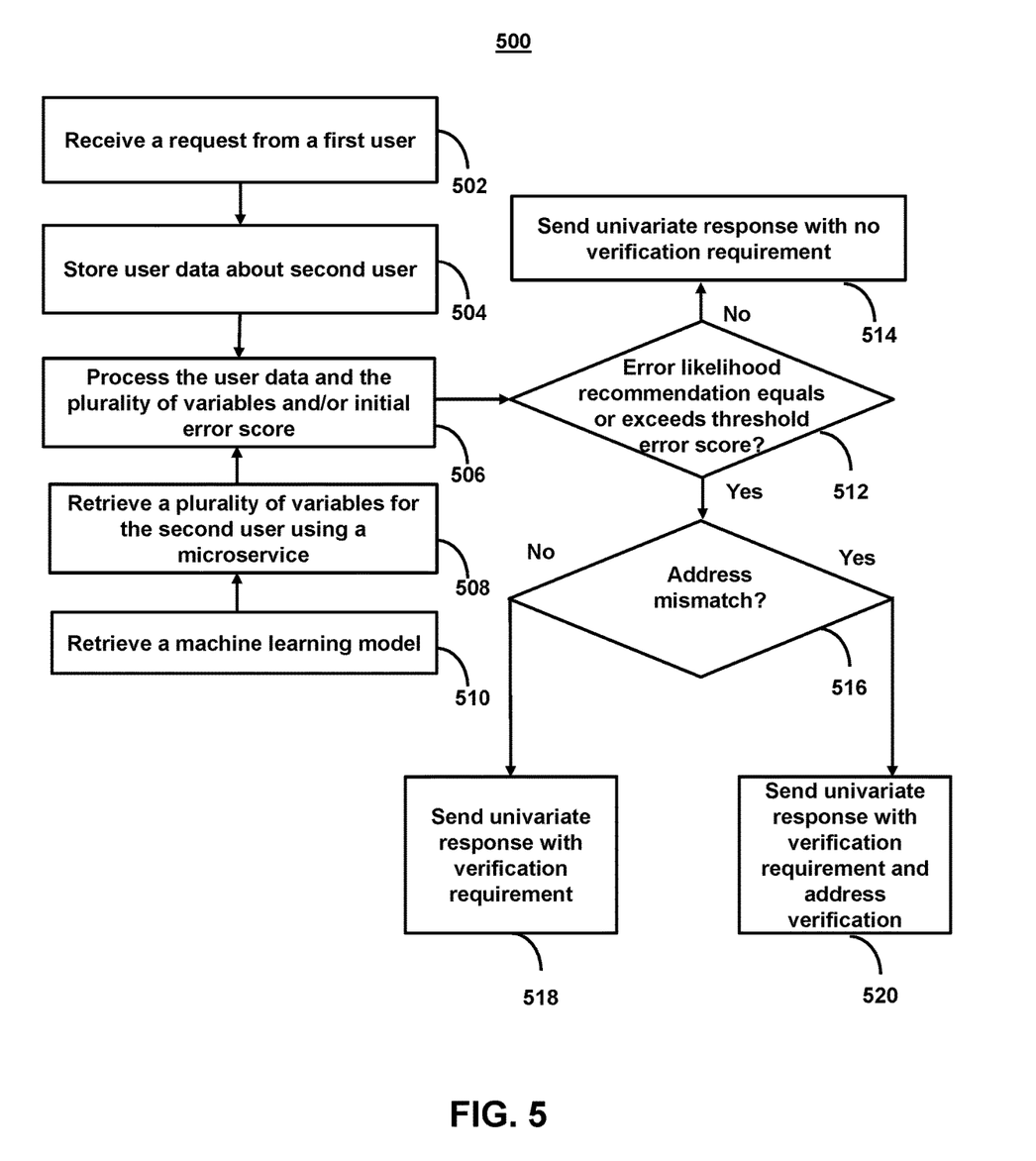
FIG. 5 shows a flowchart of the steps involved in real-time resolution of errors, in accordance with one or more embodiments.

FIG. 5 shows a flowchart of the steps involved in real-time resolution of errors, in accordance with one or more embodiments. For example, process 500 may represent the steps taken by one or more devices, as shown in FIGS. 1-3 for real-time resolution of errors detected by multivariate machine learning models using univariate responses. For example, process 500 may represent a loan application submitted by a user (e.g., via kiosk 102 (FIG. 1)).

At step 502, process 500 (e.g., using one or more components in system 400 (FIG. 4)) receives a request. For example, the system may receive a loan application. To process the loan application, a second user may submit the loan application to a machine learning model to determine whether or not there is a likelihood of fraud. In response to receiving the load application the system may use one or more preprocessing steps in order to detect and/or interpret content.

For example, the system may include one or more content-recognition modules, which may be used by the system to analyze information received with a request. For example, the system may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the objects in and/or characteristics of received information. In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text. For example, the system may receive a request based on detecting the speech of one or more users.

In addition, the system may use multiple types of optical character recognition and/or fuzzy logic, for example, when comparing multiple data fields. For example, the system may arrange the text into data fields and cross-reference the data fields with other data fields (e.g., in a lookup table database) corresponding to possible values associated with known information (e.g., frequently used for the user and/or in received requests). Using fuzzy logic, the system may determine two fields and/or values to be identical even though the substance of the data field or value (e.g., two different spellings) is not identical.

At step 504, process 500 (e.g., using one or more components in system 400 (FIG. 4)) stores user data. For example, the system may store user data submitted by the first user. The user data may comprise information supplied by the first user about a second user.

At step 510, process 500 (e.g., using one or more components in system 400 (FIG. 4)) retrieves a machine learning model. The machine learning model may be trained to return probability error scores based on a plurality of variables collected by a microservice, wherein the machine learning model comprises an XGBoost algorithm. The microservice is a collection of applications that each collect one or more of the plurality of variables.

At step 508, process 500 (e.g., using one or more components in system 400 (FIG. 4)) retrieves a plurality of variables for the second user using a microservice. For example, the microservice is a collection of applications that each collect one or more of the plurality of variables. In some embodiments, the system may retrieve the plurality of variables for the second user using the microservice in response to step 502. In some embodiments, the microservice may generate an initial error score (e.g., a fraud score) based on the plurality of variables.

For example, the system may detect an individual value of a variable that is too high (or low). For example, the system may compare each individual value against a corresponding threshold for each value. The system may then generate a score based on one or more of these values exceeding (or equaling or falling below) their corresponding thresholds. Additionally or alternatively, the system may determine an amount that each individual score exceeds its respective threshold. The system may then determine a score based on an aggregation of the number of values that do not correspond to their respective thresholds and/or an amount that each of the values does not correspond to their respective thresholds. For example, the system may aggregate these amounts and/or numbers and compare the amounts and/or numbers to respective thresholds. Additionally or alternatively, the system may dynamically update the various thresholds based on information about the number and/or frequency at which one or more of the thresholds are met. In some embodiments, the system may use machine learning models (e.g., as described herein) to determine one or more thresholds.

The system may determine the various thresholds dynamically. For example, the system may retrieve (e.g., from a lookup table database) the various thresholds in response to receiving a request. The system may retrieve these from a third party source and/or a remote source. In some embodiments, the system may determine the thresholds based on one or more criteria. For example, based on one characteristic (or lack thereof) in a request, the system may adjust and/or select particular thresholds. In some embodiments, this adjustment and/or selection may be based on a set of rules (e.g., predetermined rules established by the system and/or a third party source).

At step 506, process 500 (e.g., using one or more components in system 400 (FIG. 4)) processes the user data (e.g., stored at step 504) and the plurality of variables and/or initial error score as determined in step 508 using a machine learning model. For example at step 506, the system may generate an error likelihood recommendation comprising a probability error score for the second user generated by the machine learning model and proceed to step 512.

At step 512, process 500 (e.g., using one or more components in system 400 (FIG. 4)) compares the error likelihood recommendation determined at step 506 to a threshold error score. If the error likelihood recommendation equals or exceeds the threshold error score, the system proceeds to step 514 and determines to request a first univariate response. For example, the first univariate response may have no verification requirement. For example, if the system determines that the error likelihood recommendation indicates that there is no fraud, the system may not require any verifications. If not, process 500 continues to step 516.

At step 516, process 500 (e.g., using one or more components in system 400 (FIG. 4)) determines whether or not there is an address mismatch. For example, the system may retrieve one or more identifiers (e.g., for an address, name, etc.), and the system may determine whether or not the identifier corresponds to known information (or information in a known class for a determined type of content). If the system determines that there is an address mismatch, process 500 proceeds to step 520 and determines to request a second univariate response that includes both a verification request and an address verification (e.g., an address verification form). If not, process 500 continues to step 518. At step 518, process 500 (e.g., using one or more components in system 400 (FIG. 4)) requires a third univariate response that includes only the verification request. For example, the system may require that the user verify one or more types of user data. In some embodiments, the system may require that a user supply information from a category (e.g., the categories shown in FIG. 3) that corresponds to the user data submitted by the first user.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 5.

Figure 6:
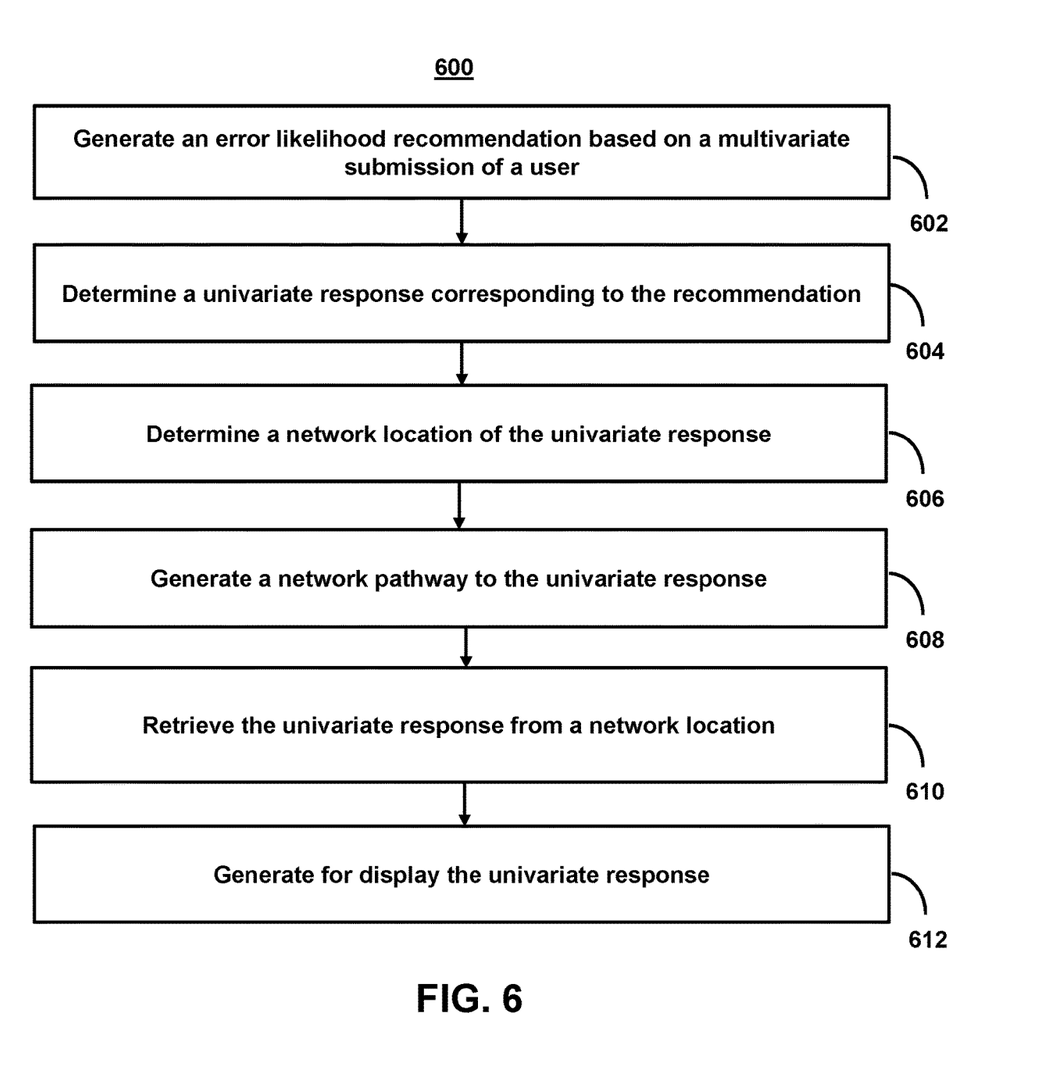
FIG. 6 shows a flowchart of the steps involved in real-time resolution of errors detected by multivariate machine learning models using univariate responses, in accordance with one or more embodiments.

FIG. 6 shows a flowchart of the steps involved in real-time resolution of errors detected by multivariate machine learning models using univariate responses, in accordance with one or more embodiments. For example, process 600 may represent the steps taken by one or more devices, as shown in FIGS. 1-3 for real-time resolution of errors detected by multivariate machine learning models using univariate responses.

At step 602, process 600 (e.g., using one or more components in system 400 (FIG. 4)) generates an error likelihood recommendation based on a multivariate submission of a user. For example, the system may generate, at a first user interface corresponding to a first user, an error likelihood recommendation based on processing a multivariate submission of a second user that is received using a second user interface using the machine learning model. The error likelihood recommendation may comprise a probability error score for the second user generated by the machine learning model. For example, the machine learning model may be trained to return probability error scores based on a plurality of variables collected by a microservice. By doing so (as opposed to definitively identifying whether or not an error has occurred), the system reduces processing time required for the recommendation. In some embodiments, the machine learning model may comprise an XGBoost algorithm, and/or the microservice is a collection of applications that each collect one or more of the plurality of variables.

For example, in some embodiments, the system may receive a first user input requesting to initiate the multivariate submission. The system may transmit, to the microservice, an identity of the second user. The system may receive, from the microservice, a collection of variables for the multivariate submission for the second user. The system may generate a feature input for the machine learning model based on the collection of variables. For example, by using a microservice to collect the plurality of variables for the multivariate machine learning model, the system limits the amount of information required to be submitted by the second user.

In some embodiments, the feature input may include one or more of the variables described in FIG. 2 and/or one or more categories of the variables described in FIG. 3. Additionally or alternatively, the system may determine a weight for each of the one or more variables and/or one or more categories. For example, the system may receive, from the microservice, a collection of variables for the multivariate submission for the second user. The system may determine a respective weight for each of the variables in the collection of variables, wherein the machine learning model processes the multivariate submission based on the weights. The system may then generate a feature input for the machine learning model based on the collection of variables.

At step 604, process 600 (e.g., using one or more components in system 400 (FIG. 4)) determines a univariate response corresponding to the recommendation. For example, the system may determine a univariate response corresponding to the recommendation. The univariate response may correspond to a particular action and/or item (e.g., documentation) that is required to complete a request in view of the detected error. By limiting the number of variables upon which the response is generated, the methods and systems both further reduce processing time, but also reduce difficulties in interpreting results (e.g., by a user during the ongoing conversation). Furthermore, the univariate response may be based on the type of error detected and/or the error likelihood. For example, the system may determine an error likelihood recommendation that may comprise a probability error score for the second user generated by the machine learning model. Based on the probability error score the system may determine what response from a plurality of responses is required.

In some embodiments, the system may determine the univariate response corresponding to the recommendation by determining an identity of the second user (e.g., a name, serial number, user profile, etc. associated with a user). The system may then determine an address of the second user (e.g., a geographic location and/or mailing address). The system may then determine whether a known address of the second user as recorded in a third party database (e.g., a government database) corresponds to the address. In response to determining that the known address does not correspond to the address, the system may request an address verification from the second user.

Alternatively or additionally, the system may determine a univariate response corresponding to the recommendation by retrieving a threshold probability error score. For example, the system may retrieve a threshold probability corresponding to an industry standard and/or based on one or more criteria. In some embodiments, the system may select the threshold probability based on the number of variables of the plurality of variables used to determine the error likelihood recommendation. Alternatively or additionally, the system may select the threshold probability based on what categories and/or a number of different categories of variables of the plurality of variables used to determine the error likelihood recommendation. The system may determine whether the threshold probability error score corresponds to the probability error score. In response to determining that the threshold probability error score corresponds to the probability error score, the system may request an additional variable of the second user.

At step 606, process 600 (e.g., using one or more components in system 400 (FIG. 4)) determines a network location of the univariate response. For example, the system may determine a network location of the univariate response (e.g., the system may determine what server, network, etc. the univariate response is located on).

At step 608, process 600 (e.g., using one or more components in system 400 (FIG. 4)) generates a network pathway to the univariate response. For example, the system may generate a network pathway (e.g., a pathway route from the location of the univariate response to a device on which the second user interface is located). For example, the system may generate an application programming interface request that is formatted based on the network location. In some embodiments, the system may determine the best path to univariate response in order to maintain the ability to generate real-time responses. For example, the system may evaluate multiple paths to the same destination network and select the optimum or shortest path to reach that network location at which the univariate response is located. For example, if multiple paths to the same network location exist, each path may use a different entry and/or exit interface on a router (or other component) to reach that network and/or network location. The system may then determine the best path using a routing protocol that compares different metrics to determine the distance to reach a network location to retrieve the univariate response. For example, a metric may be a qualitative or quantitative value used to measure the distance to a given network, such as routing information, protocol hop count, a cost based on cumulative bandwidth from source to destination, bandwidth, delay, load, and/or reliability. The system may determine the best path to the network location based on the path with the lowest metric.

For example, the system may select a network pathway based on user insights and the systems statuses. For example, a network location of a verification needed for a univariate response may be removed or replaced with an alternative location based on the current availability status of the location (e.g., if a location is currently down and/or inaccessible, then a similar location (or a location with the same verification) is generated for display). In some embodiments, the location and the alternative location may be presented as an associated pair/set to the kiosk 102 and/or secondary device 150, and, if the location is detected to be down, the system may select the alternative location in its place.

At step 610, process 600 (e.g., using one or more components in system 400 (FIG. 4)) retrieves the univariate response from the network location. For example, the system may retrieve the univariate response in an application programming interface that is specific to a network location from which the univariate response was received. In some embodiments, the system may perform load balancing in order to maintain the ability to generate real-time responses and/or pre-fetch one or more univariate responses. For example, as the processing to determine an appropriate univariate response and/or a location of the univariate response has already been performed, the system does not require duplicate API calls, which may increase processing time and inhibit the ability to retrieve the univariate response in real-time.

At step 612, process 600 (e.g., using one or more components in system 400 (FIG. 4)) generates for display the univariate response. For example, the system may generate for display, on the user interface, the univariate response on the first user interface.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for real-time resolution of errors detected by multivariate machine learning models using univariate responses, the method comprising: generating, at a first user interface corresponding to a first user, an error likelihood recommendation based on processing a multivariate submission of a second user that is received using a second user interface using the machine learning model, and wherein the machine learning model is trained to return probability error scores based on a plurality of variables collected by a microservice; determining a univariate response corresponding to the recommendation; determining a network location of the response; generating a network pathway to the response; retrieving the response from a network location; and generating for display, on the user interface, the response on the first user interface.
2. The method of any of the preceding embodiments, further comprising: receiving a first user input requesting to initiate the multivariate submission; transmitting, to the microservice, an identity of the second user; receiving, from the microservice, a collection of variables for the multivariate submission for the second user; and generating a feature input for the machine learning model based on the collection of variables.
3. The method of any of the preceding embodiments, further comprising: receiving, from the microservice, a collection of variables for the multivariate submission for the second user; determining a respective weight for each of the variables in the collection of variables, wherein the machine learning model processes the multivariate submission based on the weights; and generating a feature input for the machine learning model based on the collection of variables.
4. The method of any of the preceding embodiments, wherein the machine learning model comprises an XGBoost algorithm.
5. The method of any of the preceding embodiments, wherein determining a univariate response corresponding to the recommendation comprises: determining an identity of the second user; determining an address of the second user; determining whether a known address of the second user as recorded in a third party database corresponds to the address; and in response to determining that the known address does not correspond to the address, requesting an address verification from the second user.
6. The method of any of the preceding embodiments, wherein the error likelihood recommendation comprises a probability error score for the second user generated by the machine learning model.
7. The method of any of the preceding embodiments, wherein determining a univariate response corresponding to the recommendation: retrieving a threshold probability error score; determining whether the threshold probability error score corresponds to the probability error score; and in response to determining that the threshold probability error score corresponds to the probability error score, requesting an additional variable of the second user.
8. The method of any of the preceding embodiments, wherein the response comprises an electronically transmittable document comprising fields for receiving additional variables of the second user.
9. The method of any of the preceding embodiments, wherein generating the network pathway to the response comprises generating an application programming interface request that is formatted based on the network location, and wherein retrieving the response from the network location comprises retrieving the response in the application programming interface.
10. The method of any of the preceding embodiments, wherein the microservice is a collection of applications that each collect one or more of the plurality of variables.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.

What is claimed is:

1. A system for real-time resolution of errors detected by multivariate machine learning models during conversational interactions between users using univariate responses, the system comprising:
storage circuitry configured to store a machine learning model, wherein the machine learning model is trained to return probability error scores based on a plurality of variables collected by a microservice, wherein the machine learning model comprises an XGBoost algorithm, and wherein the microservice is a collection of applications that each collect one or more of the plurality of variables; and control circuitry configured to:
generate, at a first user interface corresponding to a first user, an error likelihood recommendation based on processing a multivariate submission that is received using a second user interface corresponding to a second user using the machine learning model, wherein the error likelihood recommendation comprises a probability error score for the second user generated by the machine learning model, wherein the probability error score is determined by:
determining a relative importance value for each variable of the plurality of variables; and
generating the probability error score based on the relative importance value for each variable of the plurality of variables;
determine, at the first user interface, a univariate response corresponding to the error likelihood recommendation, wherein the univariate response comprises an electronically transmittable document comprising fields for receiving additional variables from the first user, and wherein the univariate response is based on a comparison of the probability error score of one or more of the plurality of variables to a threshold probability error score;
determine, at the first user interface, a network location of the univariate response, wherein determining the network location comprises determining that the network location is currently accessible;
generate, at the first user interface, a network pathway to the univariate response, wherein generating the network pathway comprises evaluating multiple paths to the network location and selecting a shortest path to reach the network location;
retrieve the univariate response from the network location, wherein retrieving the univariate response from the network location comprises pre-fetching the univariate response; and
generate for display the univariate response on the first user interface, wherein the univariate response comprises a hyperlink to the electronically transmittable document.

2. A method for real-time resolution of errors detected by multivariate machine learning models during conversational interactions between users using univariate responses, the method comprising:
generating, at a first user interface corresponding to a first user, an error likelihood recommendation based on processing a multivariate submission of a second user that is received using a second user interface using a machine learning model, wherein the machine learning model is trained to return probability error scores based on a plurality of variables collected by a microservice, wherein the probability error scores are determined by:
determining a relative importance value for each variable of the plurality of variables; and
generating the probability error scores based on the relative importance value for each variable of the plurality of variables;
determining, at the first user interface, a univariate response corresponding to the error likelihood recommendation, wherein the univariate response is based on a comparison of a probability error score of one or more of the plurality of variables to a threshold probability error score;
determining, at the first user interface, a network location of the univariate response;
generating, at the first user interface, a network pathway to the univariate response;
retrieving, at the first user interface, the univariate response from the network location; and
generating for display the univariate response on the first user interface.

3. The method of claim 2, further comprising:
receiving a first user input requesting to initiate the multivariate submission;
transmitting, to the microservice, an identity of the second user;
receiving, from the microservice, a collection of variables for the multivariate submission for the second user; and
generating a feature input for the machine learning model based on the collection of variables.

4. The method of claim 2, further comprising:
receiving, from the microservice, a collection of variables for the multivariate submission for the second user;
determining a respective weight for each of the collection of variables in the collection of variables, wherein the machine learning model processes the multivariate submission based on respective weights; and
generating a feature input for the machine learning model based on the collection of variables.

5. The method of claim 2, wherein the machine learning model comprises an XGBoost algorithm.

6. The method of claim 2, wherein determining the univariate response corresponding to the error likelihood recommendation comprises:
determining an identity of the second user;
determining an address of the second user;
determining whether a known address of the second user as recorded in a third party database corresponds to the address; and
in response to determining that the known address does not correspond to the address, requesting an address verification from the second user.

7. The method of claim 2, wherein the error likelihood recommendation comprises a probability error score for the second user generated by the machine learning model.

8. The method of claim 7, wherein determining the univariate response corresponding to the error likelihood recommendation comprises:
retrieving the threshold probability error score;
determining whether the threshold probability error score corresponds to the probability error score; and
in response to determining that the threshold probability error score corresponds to the probability error score, requesting an additional variable of the second user.

9. The method of claim 2, wherein the univariate response comprises an electronically transmittable document comprising fields for receiving additional variables of the second user.

10. The method of claim 2, wherein generating the network pathway to the univariate response comprises generating an application programming interface request that is formatted based on the network location, and wherein retrieving the univariate response from the network location comprises retrieving the univariate response in an application programming interface response.

11. The method of claim 2, wherein the microservice is a collection of applications that each collect one or more of the plurality of variables.

12. A non-transitory, computer-readable media for real-time resolution of errors detected by multivariate machine learning models during conversational interactions between users using univariate responses, comprising instructions that, when executed by one or more processors, cause operations comprising:

generating, at a first user interface corresponding to a first user, an error likelihood recommendation based on processing a multivariate submission of a second user that is received using a second user interface using a machine learning model, wherein the machine learning model is trained to return probability error scores based on a plurality of variables collected by a microservice, wherein the probability error scores are determined by:

determining a relative importance value for each variable of the plurality of variables; and         generating the probability error scores based on the relative importance value for each variable of the plurality of variables;

determining, at the first user interface, a univariate response corresponding to the error likelihood recommendation, wherein the univariate response is based on a comparison of a probability error score of one or more of the plurality of variables to a threshold probability error score;

determining, at the first user interface, a network location of the univariate response;

generating, at the first user interface, a network pathway to the univariate response;

retrieving, at the first user interface, the univariate response from the network location; and     generating for display the univariate response on the first user interface.

13. The non-transitory, computer-readable media of claim 12, further comprising:

receiving a first user input requesting to initiate the multivariate submission;

transmitting, to the microservice, an identity of the second user;

receiving, from the microservice, a collection of variables for the multivariate submission for the second user; and     generating a feature input for the machine learning model based on the collection of variables.

14. The non-transitory, computer-readable media of claim 12, further comprising:

receiving, from the microservice, a collection of variables for the multivariate submission for the second user;

determining a respective weight for each of the collection of variables in the collection of variables, wherein the machine learning model processes the multivariate submission based on respective weights; and     generating a feature input for the machine learning model based on the collection of variables.

15. The non-transitory, computer-readable media of claim 12, wherein the machine learning model comprises an XGBoost algorithm.

16. The non-transitory, computer-readable media of claim 12, wherein determining the univariate response corresponding to the error likelihood recommendation comprises:

determining an identity of the second user;

determining an address of the second user;

determining whether a known address of the second user as recorded in a third party database corresponds to the address; and     in response to determining that the known address does not correspond to the address, requesting an address verification from the second user.

17. The non-transitory, computer-readable media of claim 12, wherein the error likelihood recommendation comprises a probability error score for the second user generated by the machine learning model.

18. The non-transitory, computer-readable media of claim 17, wherein determining the univariate response corresponding to the error likelihood recommendation comprises:

retrieving a threshold probability error score;

determining whether the threshold probability error score corresponds to the probability error score; and     in response to determining that the threshold probability error score corresponds to the probability error score, requesting an additional variable of the second user.

19. The non-transitory, computer-readable media of claim 12, wherein the univariate response comprises an electronically transmittable document comprising fields for receiving additional variables of the second user, and wherein the microservice is a collection of applications that each collect one or more of the plurality of variables.

20. The non-transitory, computer-readable media of claim 12, wherein generating the network pathway to the univariate response comprises generating an application programming interface request that is formatted based on the network location, and wherein retrieving the univariate response from the network location comprises retrieving the univariate response in an application programming interface response.

\* \* \* \* \*